United States Patent [19]
Emmert et al.

[11] Patent Number: 6,049,725
[45] Date of Patent: Apr. 11, 2000

[54] CHARGING CRADLE

[75] Inventors: Steven Clark Emmert, Crystal Lake; Albert Leo Nagele, Wilmette; Michael Shababy, Crystal Lake, all of Ill.

[73] Assignee: Motorola, Inc., Schaumburg, Ill.

[21] Appl. No.: 08/951,173

[22] Filed: Oct. 15, 1997

[51] Int. Cl.[7] .................................................. H04B 1/38
[52] U.S. Cl. ............................... 455/573; 455/90; 320/2
[58] Field of Search .................................... 455/572, 573, 455/575, 90, 127, 347, 351; 379/454, 455; 330/2; D13/5; D14/253

[56] References Cited

U.S. PATENT DOCUMENTS

| | | |
|---|---|---|
| D. 276,809 | 12/1984 | Taylor . |
| D. 306,299 | 2/1990 | Soren et al. . |
| D. 306,594 | 3/1990 | Taylor . |
| D. 314,173 | 1/1991 | Soren et al. . |
| D. 315,330 | 3/1991 | Soren et al. . |
| D. 346,785 | 5/1994 | Lundell et al. . |
| D. 378,911 | 4/1997 | Nagele et al. . |
| D. 384,080 | 9/1997 | Beutler et al. . |
| 5,010,565 | 4/1991 | Nash et al. ............................. 455/573 |
| 5,151,643 | 9/1992 | Emmert ................................. 455/573 |
| 5,189,358 | 2/1993 | Tomura ................................. 455/573 |

*Primary Examiner*—Thanh Cong Le
*Attorney, Agent, or Firm*—John J. King; Michael C. Soldner

[57] ABSTRACT

A charging base (4500) having a rear wall portion including center rear wall portion (4523) provides an incline for a radiotelephone when a contoured edge (792) of the radiotelephone makes contact with recessed area (4205) and outer surface (790) makes contact with a center rear wall portion (4523). Because recessed area (4205) is generally inclined, and the radio telephone when positioned on the recessed area and center rear wall portion is generally inclined, the radio telephone slides towards the guide tabs of the charging base. Further, guide elements on the charging base are used to engage corresponding guide elements in the radiotelephone to ensure that the contacts on the radiotelephone are held against contacts on the charging base at all times.

6 Claims, 5 Drawing Sheets

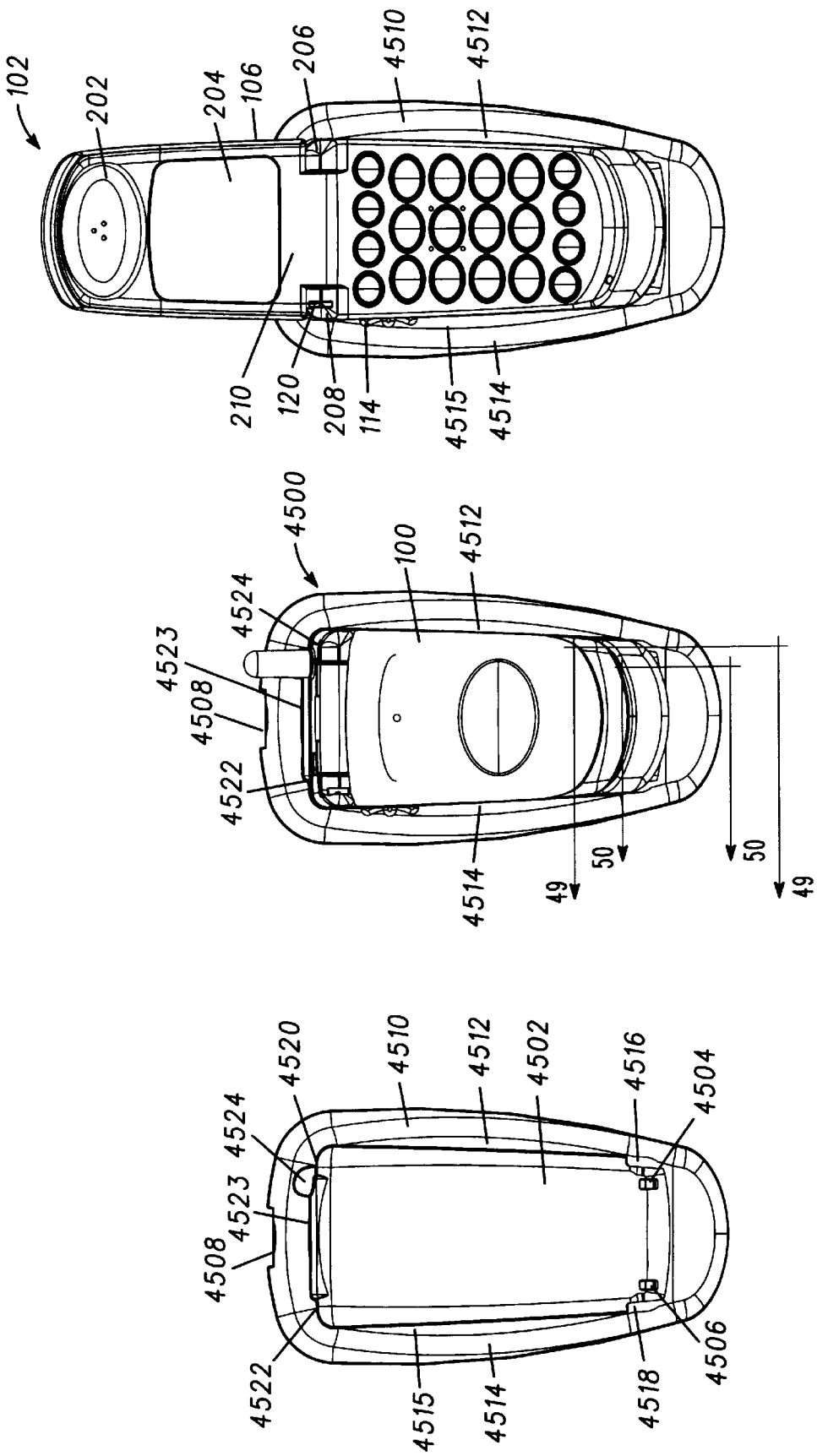

CHARGING CRADLE

FIELD OF THE INVENTION

This application is related to a charging cradle, and more particularly to a coupling apparatus for a charging cradle.

BACKGROUND OF THE INVENTION

As electronic devices such as radiotelephones become lighter, the weight of the device may be insufficient to provide an adequate contact with charging contacts of a charging base when the device is placed in the charging base. For relatively heavy electronic devices, the user need only drop the electronic device into a charging pocket of the charging base and allow gravity to provide an adequate contact pressure. However, as electronic devices have become lighter, they often require "detent locks" to retain the electronic device in a charging pocket in order to force the charging contacts to mate because gravity alone cannot provide sufficient contact pressure for the lighter device. As a result, the user of the electronic device must ensure that the electronic device has positively coupled to the charging base to engage the detent locks. Further, when the device is then removed, the charging base must be manually held against the desktop to overcome the force of the detent locks and detach the device from the charging base.

Accordingly, there is a need for a charging base for receiving a lightweight electronic device, such as a radiotelephone, which easily slides into and is easily removed from the charging base.

BRIEF DESCRIPTION OF THE DRAWINGS

FIG. 5 is a top plan view of charging base according to the present invention;

FIG. 6 is a top plan view of radiotelephone in the closed postion in charging base according to the present invention;

FIG. 7 is a top plan view of radiotelephone in the open postion in charging base according to the present invention;

DESCRIPTION OF THE PREFERRED EMBODIMENTS

The present disclosure describes a charging base for receiving a radiotelephone which easily slides into and is easily removed from the charging base. The unique design enables the coupling of charging contacts of the radiotelephone with corresponding charging contacts of the charging base without relying upon gravity or lock detents to ensure adequate contact pressure. In particular, guide elements such as guide tabs of the charging base are adapted to be inserted into corresponding guide elements such as guide slots of the radiotelephone. The combination of guide tabs and guide slots enables the radiotelephone to automatically locate itself within the charging base. The charging base also preferably comprises side and rear walls which allow the radiotelephone to be easily inserted into the charging base, and which enables a secure contact between the (contacts of the radiotelephone and the corresponding contacts of the charging base when the radiotelephone falls into the charging pocket.

The novel shape of charging base 4500 and the shape of back portion 112 of the bottom housing enables easy insertion of the radio telephone into the charging base. In particular, the rear wall portion including center rear wall portion 4523 provides an incline for the radio telephone when contoured edge 792 makes contact with recessed area 4205 and outer surface 790 makes contact with center rear wall portion 4523. Because recessed area 4205 is generally inclined, and the radio telephone when positioned on the recessed area and center rear wall portion is generally inclined, the radio telephone slides towards the guide tabs of the charging base.

Although reference is made throughout the specification to a radiotelephone, the present invention could be employed in any device having contacts which mate with contacts of a portable device, including contacts which enable charging, the transfer of data, or any other purpose. Also, although the guide tabs and guide slots are provided in the charging base and radiotelephone respectively, the guide tabs and guide slots could be placed in the radiotelephone and charging base, respectively.

Figure 1:
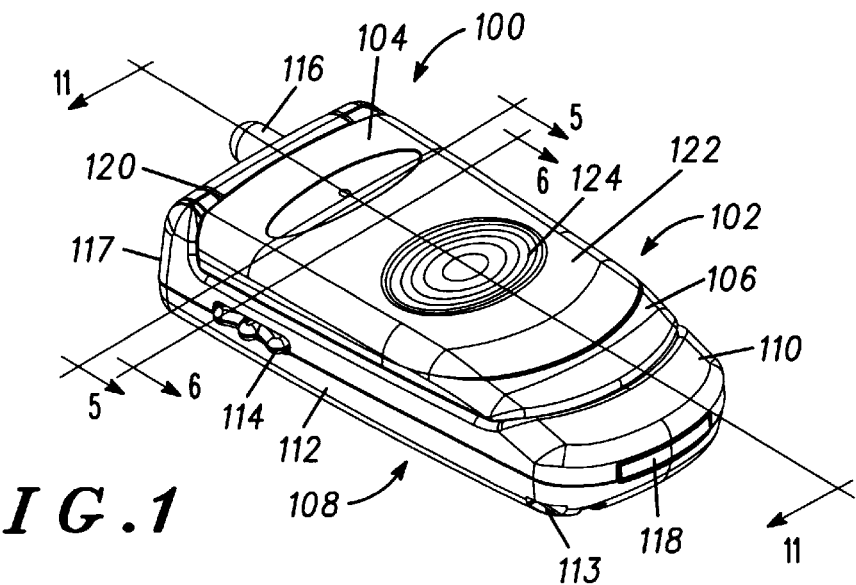
FIG. 1 is a perspective view of a radiotelephone in a closed position according to the present invention.

Turning to FIG. 1, a perspective view shows a radiotelephone 100 in a closed position. Radiotelephone 100 comprises a top housing 102 having a back portion 104 and a front portion 106, and a bottom housing 108 having a front portion 110 and a back portion 112. The back portion of the bottom housing includes a first guide slot 113, which will be described in more detail in the remaining figures. The bottom housing also includes a switch assembly 114 preferably on the side of the radiotelephone and an antenna 116 generally extending from the rear 117 of the radiotelephone. A connector 118 is also provided to generally enable input/output of data or provide a port for a cigarette lighter adapter. An indicator 120, such as a light guide for a light emitting diode (LED), is incorporated in a knuckle of the hinge of the radiotelephone. Finally, back portion 104 of the top housing comprises a top surface 122 having a finger locator 124.

Figure 2:
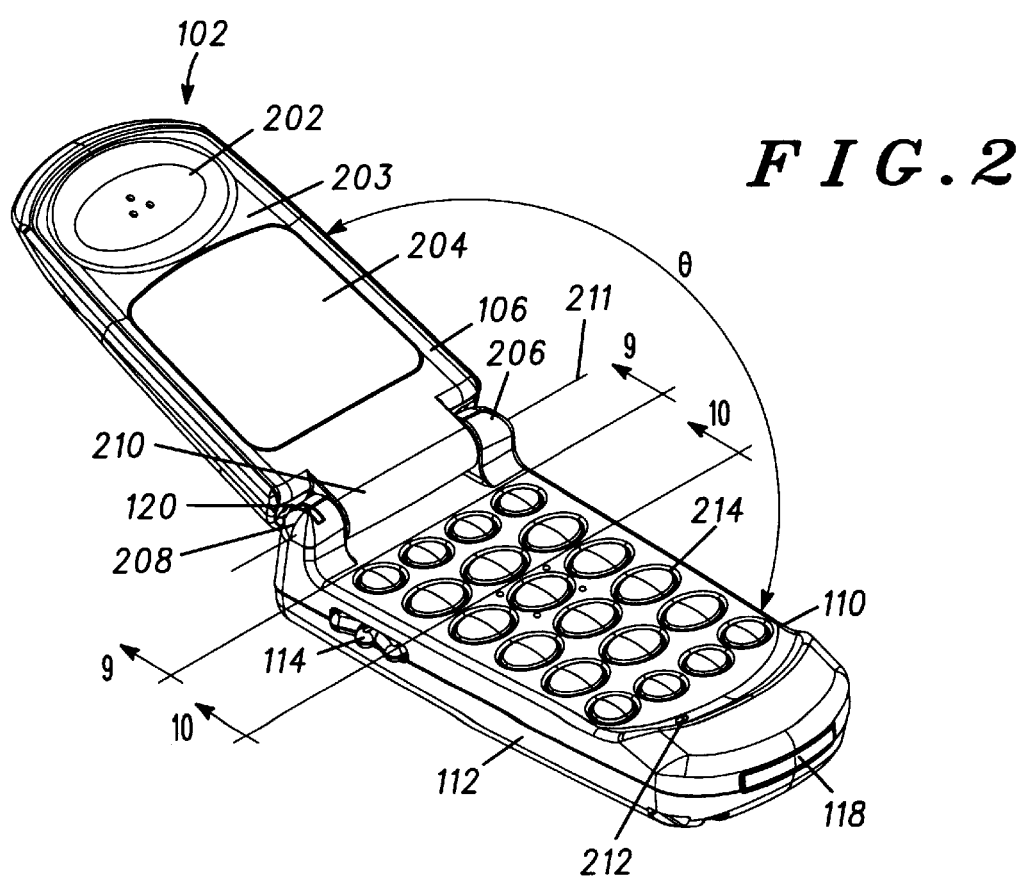
FIG. 2 is a perspective view of a radiotelephone in an open position according to the present invention.

Turning now to FIG. 2, radiotelephone 100 in the open position shows top housing 102 hingedly connected to bottom housing 108. Front portion 106 of the top housing comprises an ear piece 202 defined in bottom surface 203 and a lens 204 positioned in an aperture in the top housing. Front portion 110 of the bottom housing comprises a first knuckle 206 and a third knuckle 208 which are coupled to a second knuckle 210 of the top housing 102. The operation of the hinge will be described in more detail in reference to the remaining figures.

Figure 3:
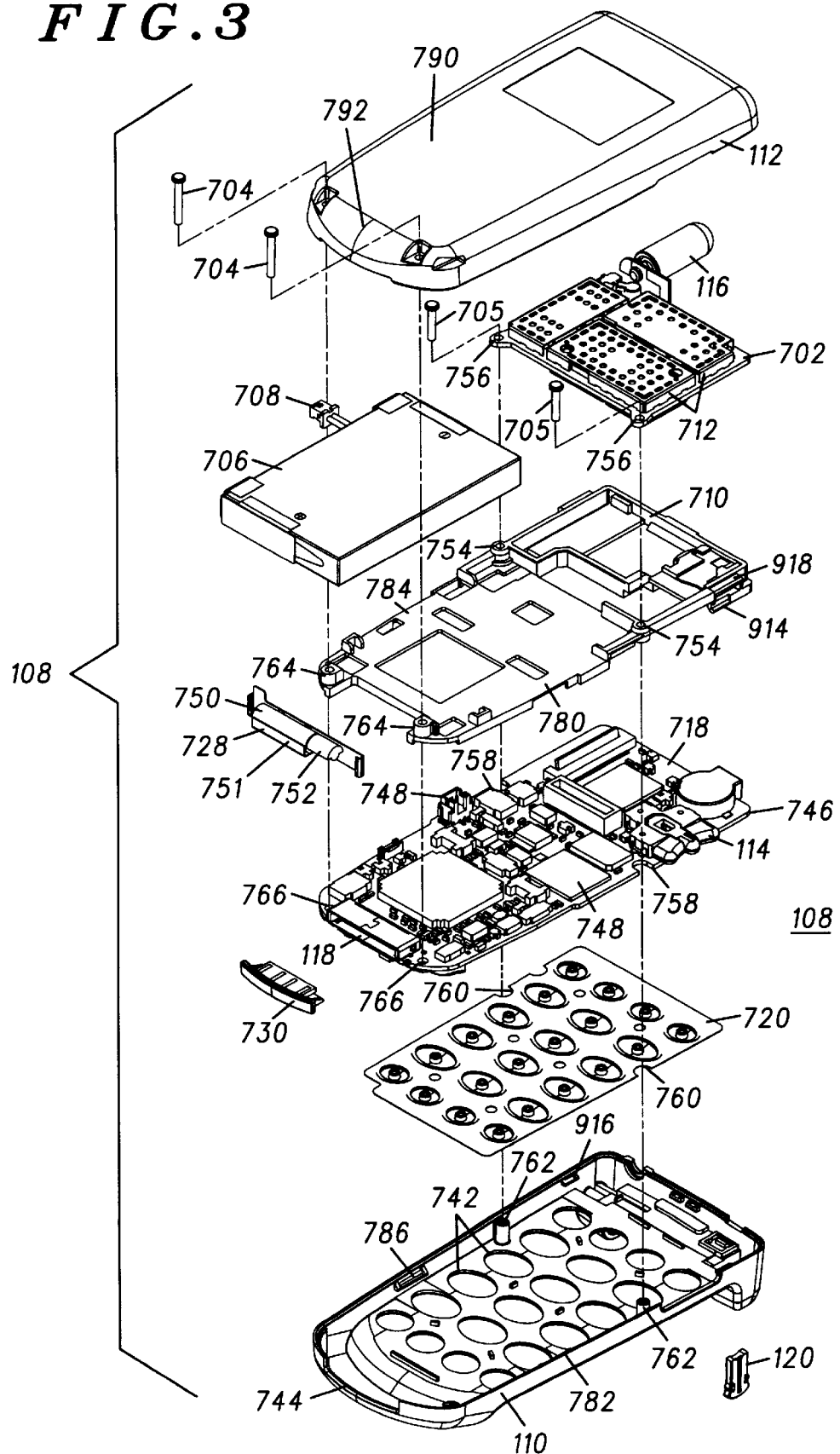
FIG. 3 is an exploded view of the bottom housing of the radiotelephone according to the present invention.

Referring now to FIG. 3, an exploded view of the bottom housing 108 of the radiotelephone 100 shows the components of the bottom housing 108. The bottom housing 108 includes the front portion 110, a keypad 720 including a plurality of keys, a logic board 718, a chassis 710, a transceiver board 702, a battery 706 and a back portion 112. The bottom housing 108 further includes a vibrator assembly 728, a data port cover 730 and the indicator 120.

The front portion 110 defines the top surface 740 of the bottom housing 108 and provides the structure which engages the top housing 102. At a first end 736, the front portion 110 includes the first knuckle 206 and third knuckle 208. The top surface defines a plurality of keyholes 742 through which extend the keys 722 of the keypad. The keyholes 742 are sized and positioned to receive the keys 722. At a second end 738, the front portion 110 defines an aperture 744 which provides access to the connector 118. The top surface of the bottom housing 108 is contoured to fit the top housing 102 when the radiotelephone 100 is folded closed.

The keypad 720 including the keys is preferably formed from a single membrane to be impervious to dirt and moisture. The keys may be arranged in any suitable configuration, including differing numbers and sizes of keys. The illustrated configuration is illustrative only. The keypad 720 rests on metal domes which provide a snap feel during key actuation.

The keypad 720 is disposed in the bottom housing 108 next to the logic board 718. The logic board 718 generally includes a printed wiring board (PWB) with components such as integrated circuits 748 attached to the PWB. The logic board 718 provides electronic functionality for the radiotelephone 100. Thus, the logic board 718 generally includes a processor or other controller which controls speech processing, timing, man-machine interface and system interface functions. Subsystems of the logic board 718 include a clock circuit which generates timing signals, a speech processor, a battery monitor including internal recharge control, memory for data storage, and input/output control.

Similarly, the transceiver board 702 controls the RF operation of the radio. The transceiver board 702 generally includes a transmitter, a power amplifier, a receiver, a duplexer or antenna switch, filters, a demodulator, a modulator and a frequency synthesizer. As is shown in FIG. 3, a portion of the circuitry on the transceiver board 702 is covered by one or more RF shields 712 to limit electromagnetic interference with surrounding circuitry.

The battery 706 in the illustrated embodiment is a self-contained, non-replaceable, rechargeable battery. The battery 706 is electrically coupled to the remainer of the radiotelephone 100 by a connector 708 which plugs into a suitable receptacle 748 on the logic board 718. In alternative embodiments, the battery 706 may be replaceable, for example, by removing a panel and disconnecting the battery 706. In the present embodiment, a non-removable battery was chosen to reduce the size of the radiotelephone 100 while maximizing the physical size and storage capacity of the battery 706. If the battery is removable, the battery 706 must be encased in a protective plastic housing, which limits the volume available for storage cells of the battery. Using a non-removable battery without a protective plastic case maximizes the volume used for storage cells and thereby maximizes the storage capacity of the battery 706.

The vibrator assembly 728 includes a motor 750 and a cam 752 and a vibrator bracket 753. To provide a silent alert, in lieu of or in addition to an audible ringer tone, the radiotelephone 100 under control of the logic board 718 turns on the motor 750 to turn the cam 752. When rotated, the unbalanced shape of the cam 752 produces a vibration sensation which alerts the user of an incoming call or other condition. The vibrator motor 750 is disposed on the vibrator bracket 751. The vibrator bracket 751 is located on and retained by one or more bosses so that the vibrator assembly rests on top of connector 118 (as viewed in FIG. 8). Thus, the vibrator assembly 728 is contained within the bottom housing 108 without occupying any space on the logic board 718.

The data port cover 730 fits in the aperture 744 formed by the front portion 110 to cover and protect the connector 118.

In alternative embodiments, the data port cover 730 may be retained by a lanyard or other means to prevent loss.

A pair of screws 705 retains the transceiver board 702, the chassis 710, the logic board 718 and the keypad 720 with the front portion 110. The transceiver board 702 includes grommets 756 which engage the heads of the screws 705. The chassis 710 includes grommets 754 through which the screws, 705 pass. Similarly, the logic board 718 includes cutouts 758 and the keypad includes cutouts 760 which engage the screws 705. The front portion 110 includes threaded retainers 762 which receive and retain the screws 705.

A second pair of screws 704 retains the back porton 112, the chassis 710 and the logic board 718. The screws 704 are inserted through the back portion 112 and extend through bosses 764 of the chassis 710. The threaded ends of the screws 704 are then inserted in holes 766 of the logic board 718 to complete the assembly.

Figure 4:
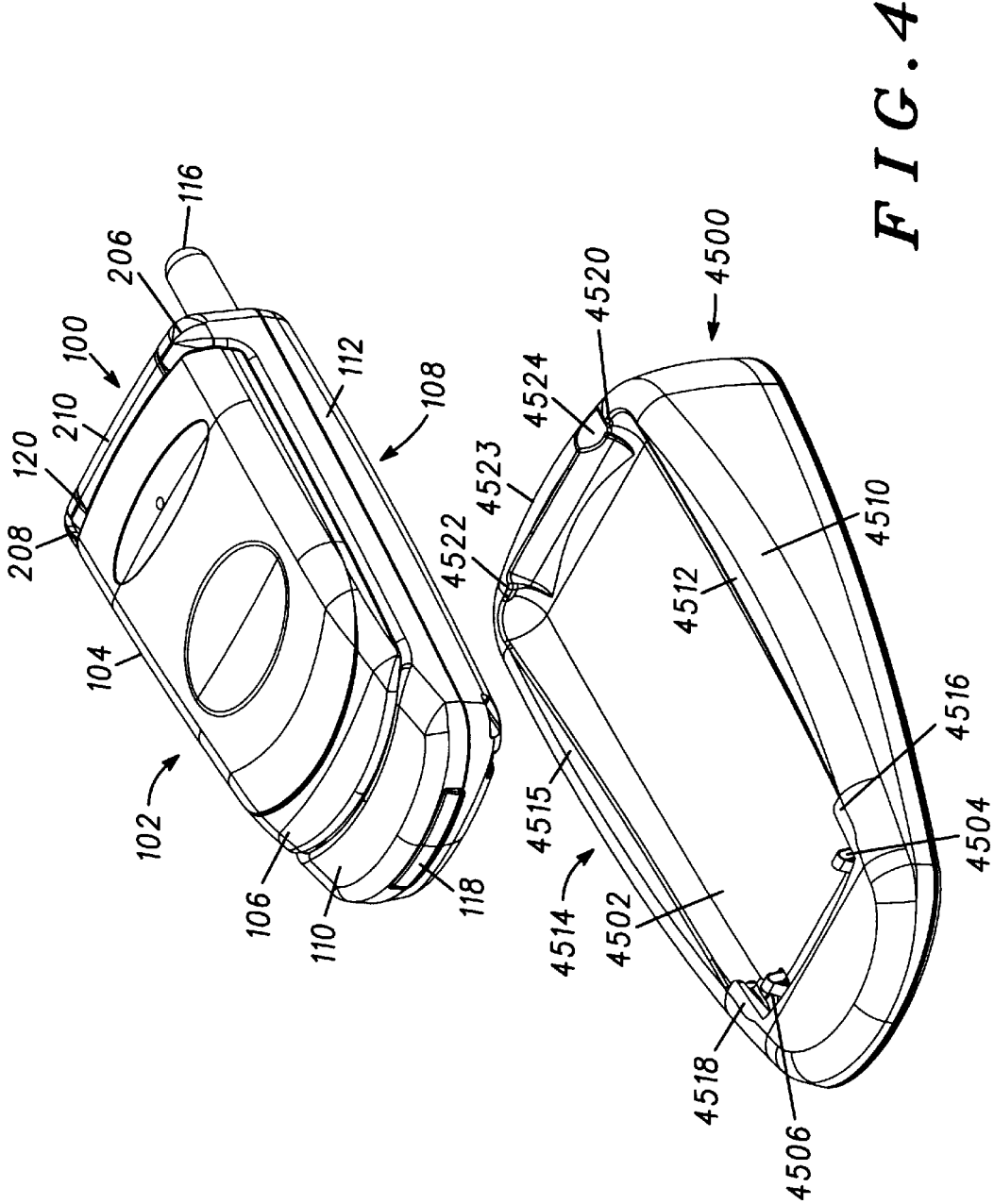
FIG. 4 is an exploded view of radiotelephone and a charging base according to the present invention.

Turning now to FIG. 4, an exploded view of radiotelephone 100 and a charging base 4500 is shown. As will be described in more detail, the novel structure of charging base 4500 enables the radiotelephone 100 to be dropped into charging base 4500, allowing gravity and the shape of the pocket to guide the radiotelephone into its proper location. The charging base preferably includes a recessed area 4502 which substantially matches the shape of the bottom housing 108 of radiotelephone 100, and is inclined at approximately 7° above horizontal, although other angles could be employed depending upon the weight of the radiotelephone, the coefficient of friction of the materials of the radiotelephone and charging base, and other factors. Charging base 4500 includes a first charging contact 4504 and a second charging contact 4506 for providing a charging current to corresponding charging contacts of radiotelephone 100. Charging base 4500 further includes a first side wall 4510 having a beveled edge 4512 and a second side wall 4514 having a similar beveled edge 4515 for guiding radiotelephone 100 into recessed area 4502. A first guide tab 4516 and a second guide tab 4518 are positioned near the lower end of the charging base to engage the corresponding guide slots of the radiotelephone. The operation of the guide tabs and guide slots will be described in more detail in reference to FIG. 9 Finally, a first rear wall portion 4520 and a second rear wall portion 4522, with a antenna recess 4524 define a recess for receiving the radiotelephone when the rear of the radiotelephone clears the rear wall portions. Although the center rear wall portion is shown slightly behind the first and second rear wall portions, a single rear wall portion extending across the back of the charger could be incorporated according to the present invention.

In operation, guide elements on the charging base are used to engage corresponding guide elements in the radiotelephone to ensure that the contacts on the radiotelephone are held against contacts on the charging base at all times. Preferably, the first guide tab and the second guide tab of the charging base couple with a first guide slot and the second guide slot respectively of the radiotelephone, forcing contacts of the radiotelephone against the first and second charging contacts when the rear of radiotelephone 100 clears the first rear wall portion 4520 and second rear wall portion 4522. When the rear of the radiotelephone falls into the charging pocket, the radiotelephone is securely positioned in the charging base as shown in FIG. 6, and the radiotelephone is not dependent upon gravity to maintain contact between the charging contacts of the radiotelephone and the charging contacts of the charging base.

The novel shape of charging base 4500 and the shape of back portion 112 of the bottom housing enables easy insertion of the radio telephone into the charging base. In particular, the rear wall portion including center rear wall portion 4523 provides an incline for the radio telephone when contoured edge 792 makes contact with recessed area 4205 and outer surface 790 makes contact with center rear wall portion 4523. Because recessed area 4205 is generally inclined, and the radio telephone when positioned on the recessed area and center rear wall portion is generally inclined, the radio telephone slides towards the guide tabs of the charging base.

In particular, because outer surface 790 and contoured edge 792 of the back portion 112 are generally concave, radiotelephone 100 moves along recessed area 4502 at a contact point of the contoured edge 792. The contact point is generally less than the entire width of the contoured edge, and reduces the friction as the radio telephone slides along the recessed area. Similarly, because center rear wall portion 4523 of the charging base is slightly convex and the outer surface 790 of the radio telephone is convex, radio telephone 100 rides along center rear wall portion at a contact point of outer surface 790. Accordingly, the radio telephone generally slides along a contact point of the recessed area and a contact point of the center rear wall portion, which depend upon the amount of curvature, minimizing the amount of friction when the radiotelephone slides into the charger. Minimizing the amount of friction reduces the amount of incline of the recessed area and/or the height of the rear wall. Further, if the radio telephone is not perfectly aligned in the charger housing during insertion, the beveled edges of the side walls of the charging base help direct the radio telephone into the recessed area, while the side walls generally act to align the radio telephone within the recessed area.

As is also apparent in FIG. 6, indicator 120 is visible when the phone is in the charging base, enabling viewing of the charging status when charging. Indicator 120 is also visible when the folded radiotelephone is placed in a shirt pocket, providing a status of the phone. Indicator 120 could be, for example, a multi-color LED providing an indication of IN USE, ROAM, NO SVC, or other states which are commonly known in the wireless communications industry. As shown in FIG. 7 with the radiotelephone in the open position, indicator 120 is also visible to show a charging status of the radiotelephone. Because the light pipe is generally centered in the knuckle and follows the curvature of the hinge, indicator 120 is viewable from the front of the handset with the top housing either opened or closed.

Figure 9:
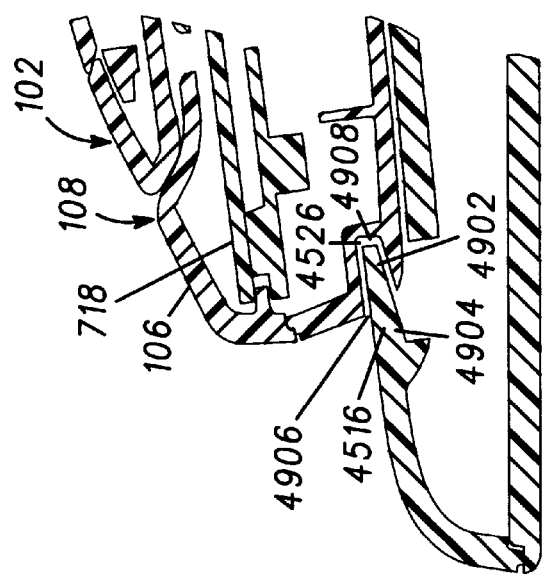
FIG. 9 is a cross-sectional view of the radiotelephone and charging base of FIG. 7 taken at lines 50—50 according to the present invention.

Turning now to FIG. 9, a cross section taken at lines 49—49 of FIG. 6 shows the coupling of first guide tab 4516 of the charging base with second guide slot 4526 of the radiotelephone. The corresponding guide tabs and guide slots are shaped to enable the coupling of the radiotelephone and the charging base. In particular, a narrow portion 4902 of first guide tab 4516 generally extends to a wide portion 4904. The corresponding second guide slot 4526 generally extends from a wide portion 4906 to a narrow portion 4908. As narrow portion 4902 of the first guide tab is advanced toward narrow portion 4908 of the second guide slot, the guide tab and the guide slot help properly orient the radiotelephone in the charging base to enable charging, as described in reference to FIG. 8.

Figure 8:
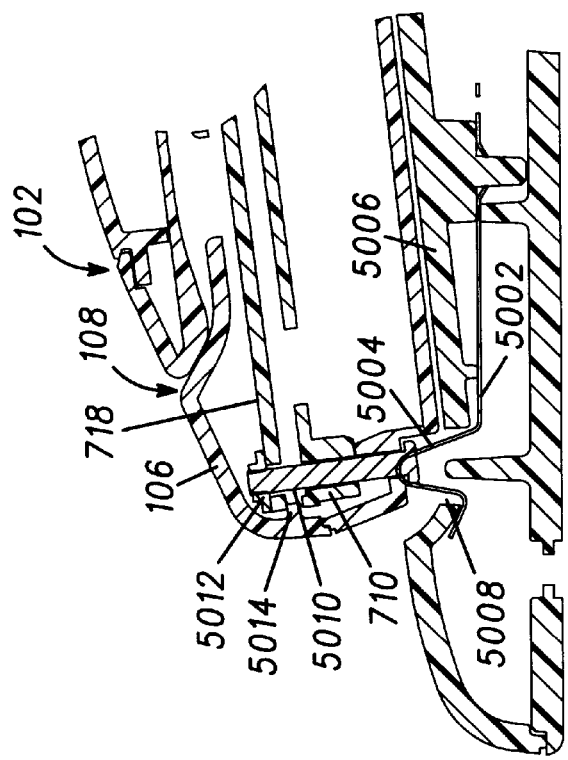
FIG. 8 is a cross-sectional view of the radiotelephone and charging base of FIG. 7 taken at lines 49—49 according to the present invention.

Turning now to FIG. 8, a cross section of FIG. 6 taken at lines 50—50 shows the charging contact arrangement according the present invention. In particular, a charging contact 5002 has a contact portion 5004 which extends through recess wall 5006 at a contact aperture 5008. Contact portion 5004 makes contact to a contact screw 5010 to enable charging of the radiotelephone. As is apparent, the head of contract screw 5010 is exposed to allow charging by the charging base. Preferably, a board contact 5012 is soldered to logic board 718. Board contact 5012 eliminates the need for an additional charging contact by utilizing the screws that hold the phone together as a connection point for charging. The board contact also eliminates, the need for a threaded insert which would normally be welded into the plastic housing and has certain height requirements. Because board contact 5012 is soldered onto the logic board, the design of the board contact is shorter than an insert, allowing for a more compact design. The logic board is assembled in front portion 106 and retained by undercuts 5014 in the front housing, allowing retention force of the screws to act on the front and rear housing.

In summary, the novel shape of charging base 4500 and the shape of back portion 112 of the bottom housing enables easy insertion of the radio telephone into the charging base. In particular, the rear wall portion including center rear wall portion 4523 provides an incline for the radiotelephone when contoured edge 792 makes contact with recessed area 4205 and outer surface 790 makes contact with center rear wall portion 4523. Because recessed area 4502 is generally inclined, and the radio telephone when positioned on the recessed area and center rear wall portion is generally inclined, the radio telephone slides towards the guide tabs of the charging base. Further, guide elements on the charging, base are used to engage corresponding guide elements in the radiotelephone to ensure that the contacts on the radiotelephone are held against contacts on the charging base at all times. Preferably, the first guide tab and the second guide tab of the charging base couple with a first guide slot and the second guide slot respectively of the radiotelephone, forcing contacts of the radiotelephone against the first and second charging contacts when the rear of radiotelephone 100 clears the first rear wall portion 4520 and second rear wall portion 4522. When the rear of the radiotelephone falls into the charging pocket, the radiotelephone is securely positioned in the charging base as shown in FIG. 6, and the radiotelephone is not dependent upon gravity to maintain contact between the charging contacts of the radiotelephone and the charging contacts of the charging base.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable cellular radiotelephones, the invention could be applied to any wireless communication device, including pagers, electronic organizers, or computers. Applicants' invention should be limited only by the following claims.

We claim:

1. A charging cradle for a portable electronic device, comprising:

inclined side walls having an upper portion and a lower portion;

an inclined recessed area between said inclined side walls;

at least one guide element extending from a first narrow portion to a first wide portion, received by a corresponding guide element on said portable electronic device extending from a second wide portion to a second narrow portion; and a rear wall for retaining said portable electronic device in said recessed area.

2. The charging cradle of claim 1, the side walls further comprising a beveled edge, wherein the beveled edge guides the portable electronic device into the recessed area and the side walls align the portable electronic device within the recessed area.

3. The charging cradle of claim 1, wherein the guide element on the portable electronic device defines a slot, the slot extending inward from the second wide portion to the second narrow portion, wherein the first narrow portion advances from the second wide portion to the second narrow portion as the at least one guide element is received within the slot.

4. The charging cradle of claim 1, wherein the portable electronic device moves along the inclined recessed area at a contact portion of a contoured edge of the portable electronic device, the contact portion being less than the width of the contoured edge.

5. The charging cradle of claim 1, the rear wall further comprising a center portion, wherein a contact portion of an outer surface of the portable electronic device is positioned along the center portion as the portable electronic devise is inserted in the recessed area.

6. A charging cradle for providing a charging current to a portable electronic device, comprising:

a first guide element, positioned on the charging cradle, outwardly extending from a first wide portion to a first narrow portion;

a second guide element, positioned on the portable electronic device, defining a slot inwardly extending from a second wide portion to a second narrow portion, the first narrow portion advancing from the second wide portion to the second narrow portion as the first guide element is received within the slot;

inclined side walls having a beveled edge;

an inclined recessed area between the inclined side walls urging the first guide element within the slot, the beveled edge guiding the portable electronic device into the inclined recessed area, and the inclined side walls aligning the portable electronic device within the inclined recessed area;

a rear wall, having a center portion, retaining the portable electronic device in the recessed area; and a back portion of the portable electronic device that includes an outer surface, having a first contact portion, and a contoured edge, having a second contact portion less than a width of the contoured edge, wherein the portable electronic device moves along the inclined recessed area at the second contact portion and the first contact portion is positioned along the center portion as the portable electronic device is inserted within the inclined recessed area.

* * * * *